United States Patent
Yamauchi

(10) Patent No.: US 8,499,310 B2
(45) Date of Patent: Jul. 30, 2013

(54) INFORMATION PROCESSING APPARATUS, DEVICE SETUP METHOD AND STORAGE MEDIUM FOR CARRYING OUT A DEVICE SETUP ON A NETWORK

(75) Inventor: Hisayuki Yamauchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1139 days.

(21) Appl. No.: 11/470,712

(22) Filed: Sep. 7, 2006

(65) Prior Publication Data

US 2007/0064266 A1 Mar. 22, 2007

(30) Foreign Application Priority Data

Sep. 22, 2005 (JP) ................................. 2005-275458

(51) Int. Cl.
*G06F 3/12* (2006.01)

(52) U.S. Cl.
USPC ......... 719/321; 358/1.13; 358/1.15; 709/208; 709/209; 710/8; 719/327

(58) Field of Classification Search
USPC ............. 358/1.13, 1.15; 709/208, 209; 710/8; 719/321, 327
See application file for complete search history.

(56) References Cited

U.S. PATENT DOCUMENTS

| 6,021,429 | A * | 2/2000 | Danknick | 709/208 |
| 6,324,571 | B1 * | 11/2001 | Hacherl | 709/208 |
| 7,571,262 | B2 * | 8/2009 | Shibata | 710/8 |
| 2002/0099707 | A1 | 7/2002 | Matsumoto | |

FOREIGN PATENT DOCUMENTS

JP 2002-189687 A 7/2002

* cited by examiner

*Primary Examiner* — Peter K Huntsinger
(74) *Attorney, Agent, or Firm* — Carter, DeLuca, Farrell & Schmidt LLP

(57) ABSTRACT

An information processing apparatus includes a stop instructing unit configured to cause a first device to stop a process of transmitting device information set in the first device to a second device; an acquiring unit configured to acquire, from the first device, transmission destination information indicating a transmission destination of the device information set in the first device; a registering unit configured to register the transmission destination information acquired by the acquiring unit; and a transmitting unit configured to, based on the transmission destination information registered by the registering unit, transmit device information to be set to a device corresponding to the transmission destination information.

14 Claims, 12 Drawing Sheets

MEMORY MAP OF STORAGE MEDIUM

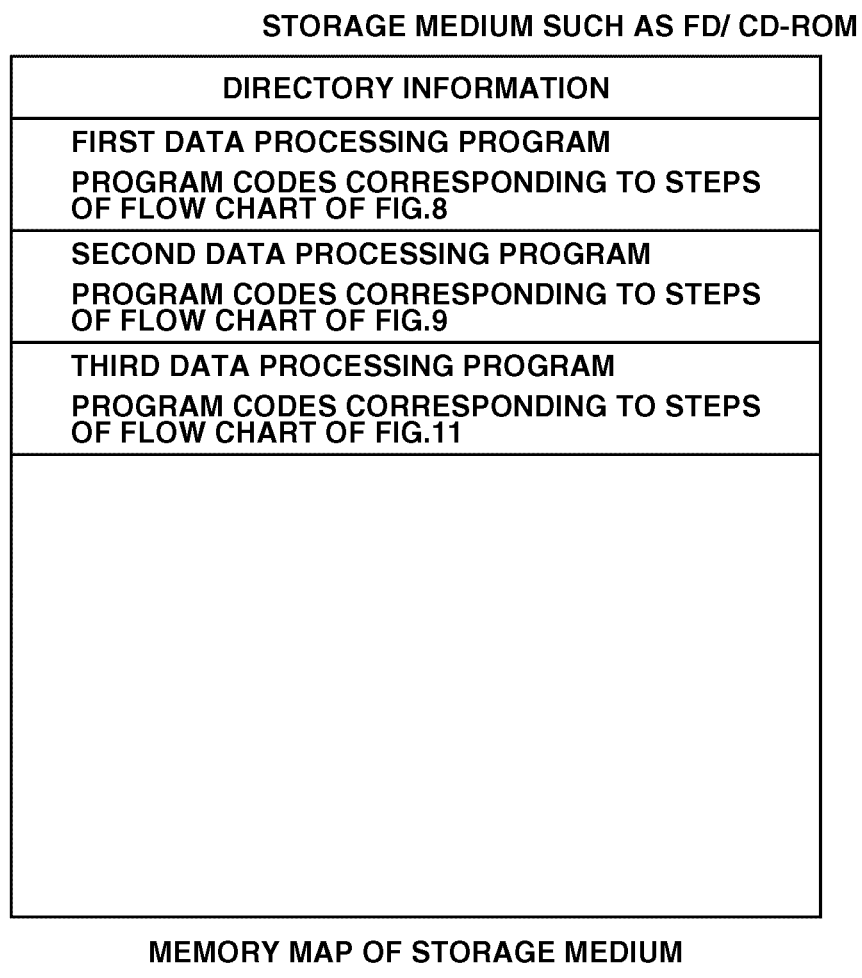

INFORMATION PROCESSING APPARATUS, DEVICE SETUP METHOD AND STORAGE MEDIUM FOR CARRYING OUT A DEVICE SETUP ON A NETWORK

BACKGROUND OF THE INVENTION

1. Field of the Invention

The present invention relates to a device set up process for an information processing apparatus that carries out a device setup on a network by communicating with a plurality of devices via a network.

2. Description of the Related Art

For years now, computers, such as personal computers (PCs), have been widely utilized in homes and offices. Also, networks, such as local area networks (LANs) that mutually connect computers, have also become more widespread.

For instance, environments that enable apparatuses, such as printers and scanners connected to a network to be shared and used among a plurality of users, have been widely utilized. This is specially true in office environments. For example, multifunction peripherals (MFPs) which have a plurality of functions such as printer and scanner functions and of which can further share and use these functions via a network are now common in office environments.

Moreover, in recent years network technologies have remarkably improved with the widespread use of large-scale networks such as the Internet. Among them, a technology called "web service" that allows the use of various services on a network is attracting attention. With web service, devices connected to the network cooperate with one another using technology related to the World Wide Web (WWW) such as XML (Extensible Markup Language) and SOAP (Simple Object Access Protocol).

With regard to the market for MFPs in recent years, MFPs of web service type that provide web services such as print and scan services on the network are being developed and are being put to a practical use. In addition to that, in MFPs of web service type, a service called a device information transmission service has been proposed. In the device information transmission service, MFPs own device setup information and various information held in an MFP are transmitted to another MFP existing on the network, and device information is shared by the MFPs on the network.

In a network system in which the setup information is shared by devices using the device information transmission service, basic setup information which is required for a device to operate, such as a network setup of the device, is included in transmission information that is transmitted from an MFP providing the device information transmission service. Further, various information held in a device can be included in the transmission information, such as an address book for managing address information of users who utilize the device.

A plurality of MFPs on the network can use the device information transmission service. In this way, the devices can share the device setup individually. Therefore, a great reduction in the management cost of the network system can be expected.

Japanese Patent Application Laid-Open No. 2002-189687 discusses a system that performs a process for transmitting document information in the above-mentioned network environment. Here, a transmission server defines a transmission setup of document information generated at a device, and performs a registration process for document information to a folder in a document management server based on the transmission setup. Moreover, the transmission server performs an attaching process for document information to an E-mail address via a mail server. In addition, the transmission server performs an output process for a document transmission job to a device.

Thus, in the system discussed in Japanese Patent Application Laid-Open No. 2002-189687, the transmission setup of a device is performed by a transmission server, and each transmission process for stored data is performed by a device based on that setup.

However, the transmission server in Japanese Patent Application Laid-Open No. 2002-189687 can operate on the assumption that the setups and changes by the devices or the document management server are not restricted. Therefore, if a unit that is allowed to change the system environment of a network is limited to a specific device or server, a process for canceling the limitation is needed.

More specifically, in a system in which setups for a plurality of devices are shared using the above-described device information transmission service, an MFP itself becomes a server apparatus (parent device) to transmit the MFP's own device setup to another MFP (child device). That is to say, the device of the transmission source of device information is called a parent device, and the device of the transmission destination of device information is called a child device.

In addition to the aforementioned system ("first system") configured in the form of device-to-device communication, a second system can be designed as described below. In the second system, for instance, a server apparatus having installed thereon a device information transmission application utility software capable of facilitating unitary management of devices is connected to a network. The server apparatus transmits predetermined device information to an MFP on the network. The device information transmission application utility software is hereinafter referred to as a device information transmission application.

The first system configured in the form of device-to-device communication is used by a small-scale system environment having a small number of devices. On the other hand, generally, the second system configured in the form of server-to-device communication is used by a large-scale system environment where numerous devices, on the scale of tens or perhaps many hundreds, are installed.

The size of the first system which only includes a few devices may be enlarged by increasing the number of devices in some cases. In these cases, a server apparatus having installed thereon the device information transmission application capable of facilitating unitary management of a great number of devices is introduced to the system to attain shifting to a large-scale system.

Thus, there is a case where the first system that performs a device information transmission from a parent device to a child device can be shifted to the second system that performs a unitary device information transmission using the device information transmission application. In this case, it is necessary to change the transmission setup of each device (transmission destination setup of the parent device on the transmission side and reception setup of the child device on the receiving side).

However, there is no feature available yet that can collectively control an ON/OFF setup for a transmission service at the parent device side and an accept/refuse setup for device information at the child device side. Thus, it is necessary to make changes to each setup of each device individually via a remote operation or a direct user interface operation. And such a manual operation by a system administrator is complex in the large-scale system, so that an operation error is likely to occur.

Moreover, in the network system discussed in Japanese Patent Application Laid-Open No. 2002-189687, no determinations can be configured to permit or cancel the limitation to a device in the case of changing a transmission source for the transmission service. Therefore, there is a likelihood of transmitting device information from a transmission source that is unintended by the system administrator by mistake. Thus, setup information cannot be correctly shared by devices.

SUMMARY OF THE INVENTION

The present invention is directed to a system and/or device, method, and program for stopping a transmission service for device information from a parent device to a child device among a plurality of devices in response to a stop instruction generated by an information processing apparatus.

According to an aspect of the present invention, an information processing apparatus is provided which include a stop instructing unit configured to cause a first device to stop a process of transmitting device information set in the first device to a second device; an acquiring unit configured to acquire, from the first device, transmission destination information indicating a transmission destination of the device information set in the first device; a registering unit configured to register the transmission destination information acquired by the acquiring unit; and a transmitting unit configured to, based on the transmission destination information registered by the registering unit, transmit device information to be set to a device corresponding to the transmission destination information.

According to another aspect of the present invention, the first device may include a first determining unit configured to determine whether the process can be stopped based on a stop instruction from the stop instructing unit; and a first notifying unit configured to notify the second device of information indicating the information processing apparatus if it is determined by the first determining unit that the process can be stopped.

According to another aspect of the present invention, the second device may include a second acquiring unit configured to acquire, from the first device, the information indicating the information processing apparatus; a second determining unit configured to determine whether transmission source information indicating a transmission source of the device information can be changed based on the information acquired by the second acquiring unit; and a changing unit configured to change registered transmission source information based on the information indicating the information processing apparatus, if it is determined by the second determining unit that the transmission source information can be changed.

Moreover, according to an aspect of the present invention, the first device shifts to a device refusing setup of the process from a local or remote place if it is determined by the first determining unit that the process can be stopped.

Furthermore, according to another aspect of the present invention, the information processing apparatus may further include a start requesting unit configured to cause the first device to start a process of transmitting device information set in the first device to the second device; a third determining unit configured to determine whether the first device has returned to a transmission source of the device information based on response data notified from the first device in response to a start request by the start requesting unit; a second notifying unit configured to notify another device of a change of the transmission source of the device information to the first device if it is determined by the third determining unit that the first device has returned to the transmission source.

According to yet another aspect of the present invention, the first device may further include a fourth determining unit configured to determine whether the process can be restarted based on the start request notified from the information processing apparatus; and a third notifying unit configured to notify the information processing apparatus of response data indicating a restart of the process if it is determined by the fourth determining unit that the process can be restarted.

Additionally, according to yet another aspect of the present invention, the device information may include setup information on each device and address information on users utilizing each device.

Also, according to still yet another aspect of the present invention, a device setup method is provided which includes causing a first device to stop a process of transmitting device information set in the first device to a second device; acquiring from the first device, transmission destination information indicating a transmission destination of the device information set in the first device; registering the acquired transmission destination information; and based on the registered transmission destination information, transmitting device information to be set to a device corresponding to the transmission destination information.

And, according to yet another aspect of the present invention, a computer readable medium is provided containing computer-executable instructions for causing an information processing apparatus to execute a device setup. Here, the computer readable medium includes computer-executable instructions for causing a first device to stop a process of transmitting device information set in the first device to a second device; computer-executable instructions for acquiring from the first device, transmission destination information indicating a transmission destination of the device information set in the first device; computer-executable instructions for registering the acquired transmission destination information; and computer-executable instructions for, based on the registered transmission destination information, transmitting device information to be set to a device corresponding to the transmission destination information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the present invention and, together with the description, serve to explain the principles of the invention.

FIG. 13 is a chart illustrating an exemplary memory map of a storage media storing various data processing programs readable by a device according to an exemplary embodiment of the present invention.

DETAILED DESCRIPTION OF THE EMBODIMENTS

Various exemplary embodiments, features and aspects of the present invention will be described in detail below with reference to the drawings.
First Exemplary Embodiment
<Description of System Configuration>

Figure 1:
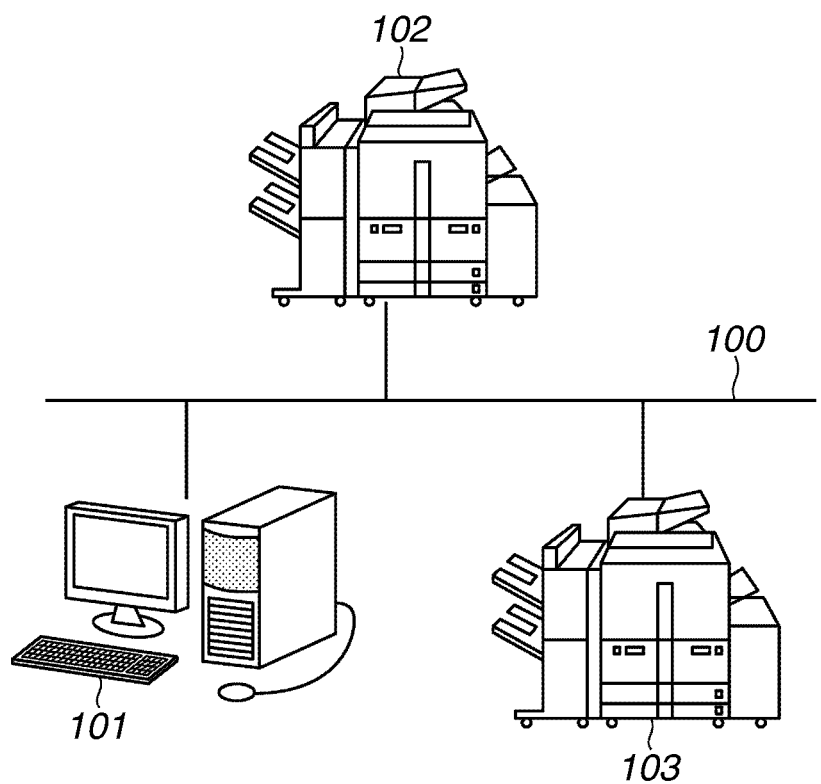
FIG. 1 illustrates an example of a network system in accordance with a first exemplary embodiment of the present invention.

FIG. 1 illustrates an example of a network system in accordance with a first exemplary embodiment of the present invention. As a device, a printing device is shown in this example. The present invention is applicable to not only the printing device but also other devices (e.g., MFPs) which may be connected in this system.

Referring to FIG. 1, a server apparatus 101 has a function to transmit device information by the device information transmission service, and a function to control the transmission service to a device that receives the device information transmission service on a network. Moreover, a utility software application, which corresponds to a device information transmission processing unit 601 which will be described below, for executing the functions described above is installed on the server apparatus 101.

Printing devices (MFPs) 102 and 103 have the print and scan functions to execute print, copy, and scan processing. Each of the printing devices 102 and 103 can communicate with a client computer (not shown) using a predetermined protocol to exchange print and scan jobs.

Moreover, the printing devices 102 and 103 have the function (correspond to a device information transmission processing unit 403 which will be described below) to receive the device information transmitted by the device information transmission service of the server apparatus 101, by communicating with the server apparatus 101 using a predetermined protocol.

The server apparatus 101 and the printing devices 102 and 103 are mutually connected via a network 100 and can perform data communication with one another. All of the server apparatus 101 and the printing devices 102 and 103 are compliant with the network. It is noted that, in the present embodiment, two MFPs are connected in the system. However, the system can include a plurality of devices.

Figure 2:
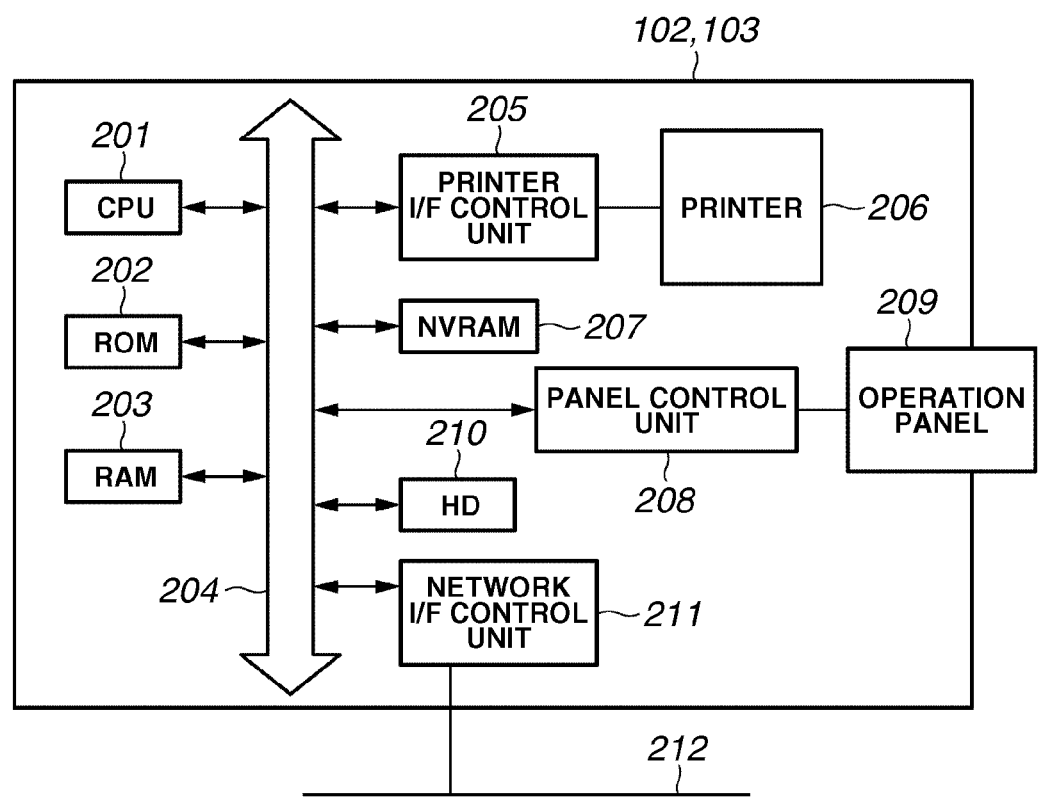
FIG. 2 is a block diagram showing an example hardware configuration of a printing device of FIG. 1 in accordance with the first exemplary embodiment of the present invention.

FIG. 2 is a block diagram showing an example hardware configuration of the printing device 102 or 103 of FIG. 1 in accordance with the first exemplary embodiment of the present invention. A CPU (central processing unit) 201 in FIG. 2 executes programs stored on a ROM 202 or a hard disk 210, and totally controls each of units connected to a system bus 204.

A RAM 203 functions as a main memory and work area of the CPU 201. A printer I/F control unit 205 controls a printer 206 that functions as an engine. Various functional processing is executed by the programs stored on the CPU 201, the ROM 202, or the hard disk 210 of the printing device 102 or 103. A non-volatile random-access memory (NVRAM) 207 is a non-volatile memory that stores various setup values of the printing device 102 or 103.

A panel control unit 208 controls an operation panel 209 to display various information and to allow a user to input an instruction. The hard disk (HD) 210 is a non-volatile storage medium, and stores various data and control programs to control the printing device 102 or 103.

A network I/F control unit 211 controls data transmission and reception from the server apparatus 101 or a client apparatus (not shown) via a LAN 212. Moreover, the printing device 102 can communicate with the printing device 103 via the LAN 212. In the present embodiment, the LAN 212 corresponds to the network 100 in FIG. 1. Moreover, the HD 210 or the NVRAM 207 stores network information, such as an IP address set by a network administrator, and ID information unique to the printing device 102 or 103.

Figure 3:
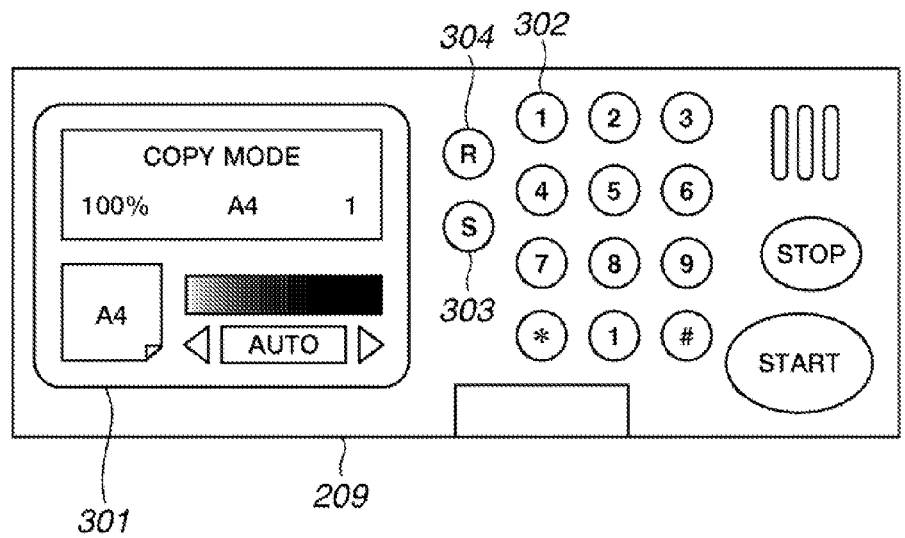
FIG. 3 is an outline plan view that illustrates an exemplary operation panel configuration of FIG. 2.

FIG. 3 is an outline plan view that illustrates an exemplary configuration of the operation panel 209 in FIG. 2. In the present embodiment, the operation panel 209 functions as a user interface unit of the printing device 102 or 103.

Referring to FIG. 3, a user can manipulate a large-scale touch panel 301 to carry out various setups. Note that, in FIG. 3, a copy mode screen is displayed on the touch panel 301. A numeric keypad 302 is used to input values such as numbers. When a service button (S button) 303 is pressed, various service screens are displayed on the touch panel 301, and services other than copying can be executed. When a setup button (R button) 304 is pressed, various setup screens are displayed on the touch panel 301, and parameters can be set.

Figure 4:
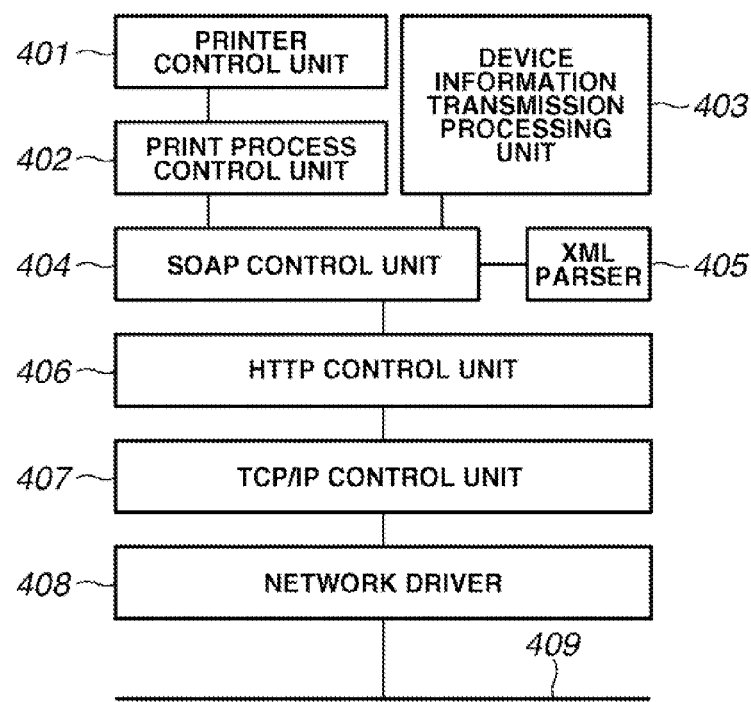
FIG. 4 is a block diagram showing an exemplary software configuration of the printing device shown in FIG. 1.

FIG. 4 is a block diagram showing the software configuration of the printing device 102 or 103 shown in FIG. 1. A printer control unit 401 controls the printer I/F control unit 205 in FIG. 2, transmits data to the printer 206 in FIG. 2, and controls a paper discharge. A print processing control unit 402 converts received data into printable data, and performs various control related to printing such as the number of prints and the two-sided printing.

A device information transmission processing unit 403 is a module to execute various processing that relates to services such as transmission and reception of transmission information, and generation of various transmission information at a device information service providing device. The device information transmission processing unit 403 performs various processing of the transmission information service in the service transmission device and receiving device, respectively.

A network driver 408 controls the network I/F control unit 211 in FIG. 2, and controls the data transmission and reception with a network 409. A TCP/IP control unit 407 transmits, receives, and controls data using a TCP/IP protocol. An HTTP control unit 406 has a server or client function for an HTTP protocol. The HTTP control unit 406 creates an HTTP request packet in response to an instruction from a higher-level application, and transmits the packet data to each printing device on the network.

The HTTP control unit 406 also analyzes an HTTP response packet transmitted from a printing device, and sends the analyzed data to a higher-level application, such as a SOAP control unit 404, the device information transmission processing unit 403, and a print processing control unit 402.

On the other hand, when data on the device information transmission is received from each device on the network, the HTTP control unit 406 analyzes the received HTTP request packet. Then, the HTTP control unit 406 sends the analyzed data to a higher-level application, such as the SOAP control unit 404, the device information transmission processing unit 403, and the print processing control unit 402. Then, the HTTP control unit 406 transmits an HTTP response packet to each device on the network in response to an instruction from the higher-level application.

The SOAP control unit 404 is a module that controls a protocol called SOAP (Simple Object Access Protocol). This module analyzes data of XML (Extensible Markup Language) format received from each device on the network using an XML parser 405. Then, the SOAP control unit 404 calls an appropriate module of the print processing control unit 402, and sends data transmitted from each device on the network to the device information transmission processing unit 403. At the same time, the SOAP control unit 404 converts data that should be returned to each device into XML data, and performs control to transmit the data to each device via the HTTP server control unit 406. The XML parser 405 is a module that inputs XML format data and outputs an analytical result.

In the present embodiment, protocols such as HTTP and SOAP are used in the data transmission and reception of the device information transmission services between the devices. However, if the two-way communication is possible, any existing or original communication protocol can be used.

Figure 5:
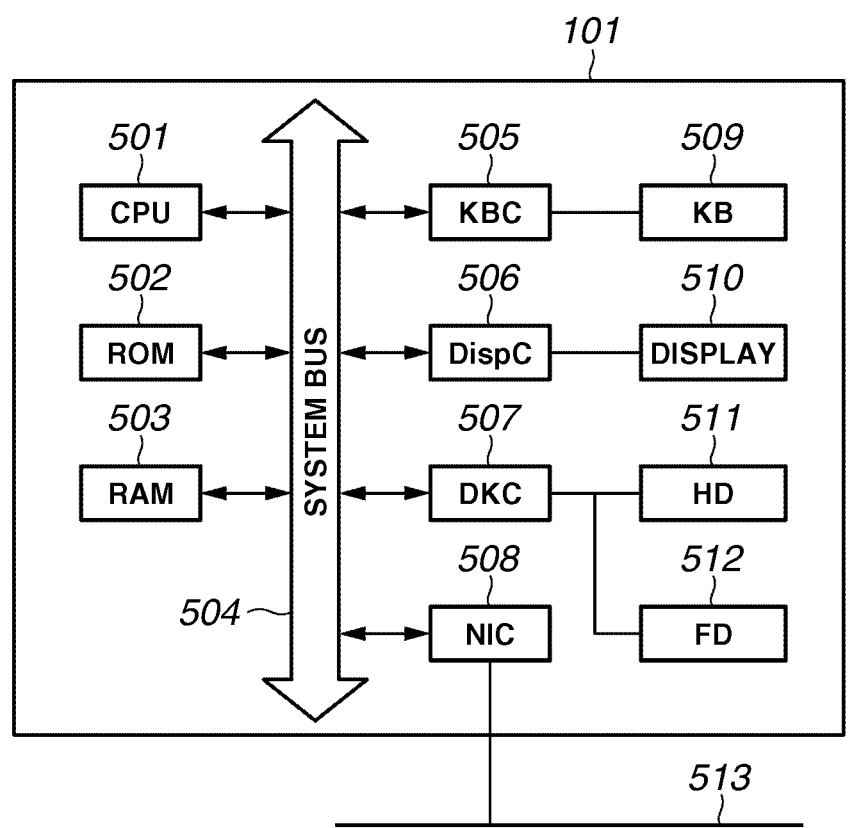
FIG. 5 is a block diagram showing a hardware an exemplary configuration of a server apparatus shown in FIG. 1.

FIG. 5 is a block diagram showing an exemplary hardware configuration of the server apparatus 101 in FIG. 1. The server apparatus 101 includes a general-purpose personal computer. The server apparatus 101 also includes a CPU 501 to execute programs stored in non-volatile storage media such as a flexible disk drive (FD) 512, a hard disk (HD) 511, or a ROM 502. The CPU 501 totally controls each unit connected through a system bus 504 based on the programs.

A RAM 503 functions as a main memory and work area of the CPU 501. A keyboard controller (KBC) 505 controls an instruction input from a keyboard (KB) 509 or a pointing device such as a mouse (not shown). A display controller (DispC) 506 controls display of a screen display device (Display) 510 such as a cathode-ray tube (CRT) display or a liquid crystal display.

A disk controller (DKC) 507 controls access to the hard disk (HD) 511 and the flexible disk (FD) 512. Boot programs (start programs that begin execution (operation) of the hardware and software) are stored on the hard disk (HD) 511 and the flexible disk (FD) 512. Moreover, a plurality of applications, edit files, user files, and network management programs are stored on the hard disk (HD) 511 and the flexible disk (FD) 512.

A network interface (I/F) control unit (NIC) 508 exchanges in two-ways data with other network apparatuses, such as a printing device, via a LAN 513. In the present embodiment, the LAN 513 corresponds to the network 100 in FIG. 1.

Figure 6:
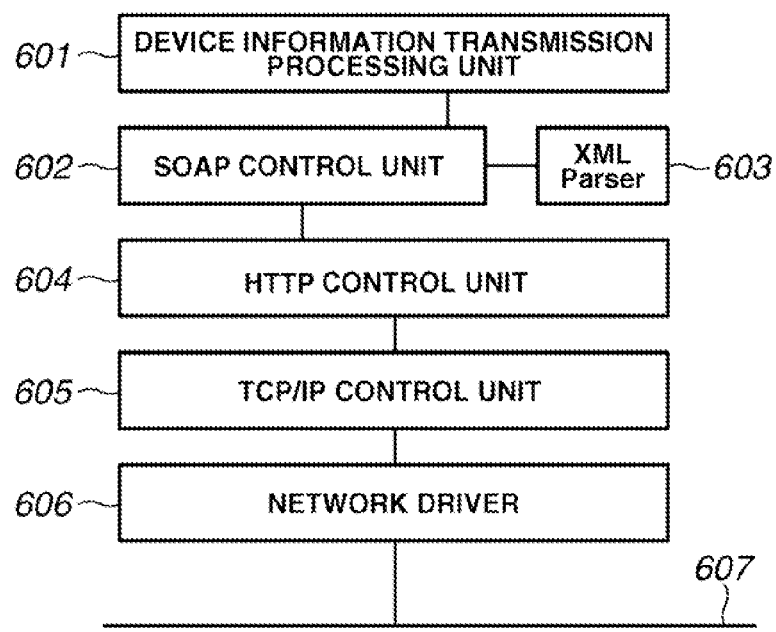
FIG. 6 is a block diagram showing an exemplary software configuration of the server apparatus shown in FIG. 1.

FIG. 6 is a block diagram showing an exemplary software configuration of the server apparatus 101 in FIG. 1. A device information transmission processing unit 601 is a module that executes processing of the device information service in the present embodiment.

A network driver 606 controls the network I/F control unit 211 in FIG. 2, and controls the data transmission and reception with a network 607. A TCP/IP control unit 605 transmits, receives and controls data using the TCP/IP protocol.

An HTTP control unit 604 has a server or client function according to the HTTP protocol. The HTTP control unit 604 creates an HTTP request packet in response to an instruction from a higher-level application. The HTTP control unit 604 transmits data to each printing device on the network, analyzes an HTTP response packet transmitted from a printing device, and executes a process for sending the analyzed data to a higher-level application, such as the SOAP control unit 602 and the device information transmission processing unit 601.

On the other hand, when data on the device information transmission is received from each device on the network, the HTTP control unit 604 analyzes the received HTTP request packet, and sends the analyzed data to a higher-level application, such as the SOAP control unit 602 and the device information transmission processing unit 601. At the same time, the HTTP control unit 604 transmits an HTTP response packet to each device on the network in response to an instruction from the higher-level application.

The SOAP control unit 602 is a module that controls a protocol called SOAP (Simple Object Access Protocol). Then, the SOAP control unit 602 analyzes data of XML (Extensible Markup Language) format received from a terminal device using an XML parser 603, and sends the analyzed data to a higher-level module. At the same time, the SOAP control unit 602 converts data that should be returned to a printing device into XML data, and performs control to transmit the data to the printing device through the HTTP control unit 604. The XML parser 603 is a module that inputs XML format data and outputs an analytical result.

In the present embodiment, protocols such as HTTP and SOAP are used in the data transmission and reception of the device information transmission service between the devices. If two-way communication is possible, any existing or original communication protocols can be used.

According to the network system configured in this way, the plurality of printing devices 102 and 103 and the server apparatus 101 communicate with one another in this network system performing an unitary transmission processing of the predetermined device information. In the server apparatus 101, the device information transmission processing unit 601 transmits a stop request for the device information transmission service to a parent device among a plurality of devices that is set as a transmission source for predetermined device information, according to a control procedure shown in FIG. 7.

Then, based on response data from the printing device 102 serving as a parent device, the server apparatus 101 acquires transmission destination information indicating a destination to which the device information transmission service is provided by the printing device 102. Then, the server apparatus 101 registers the transmission destination information for the device information transmission service in a storage unit (for instance, the hard disk 511 shown in FIG. 5).

Figure 8:
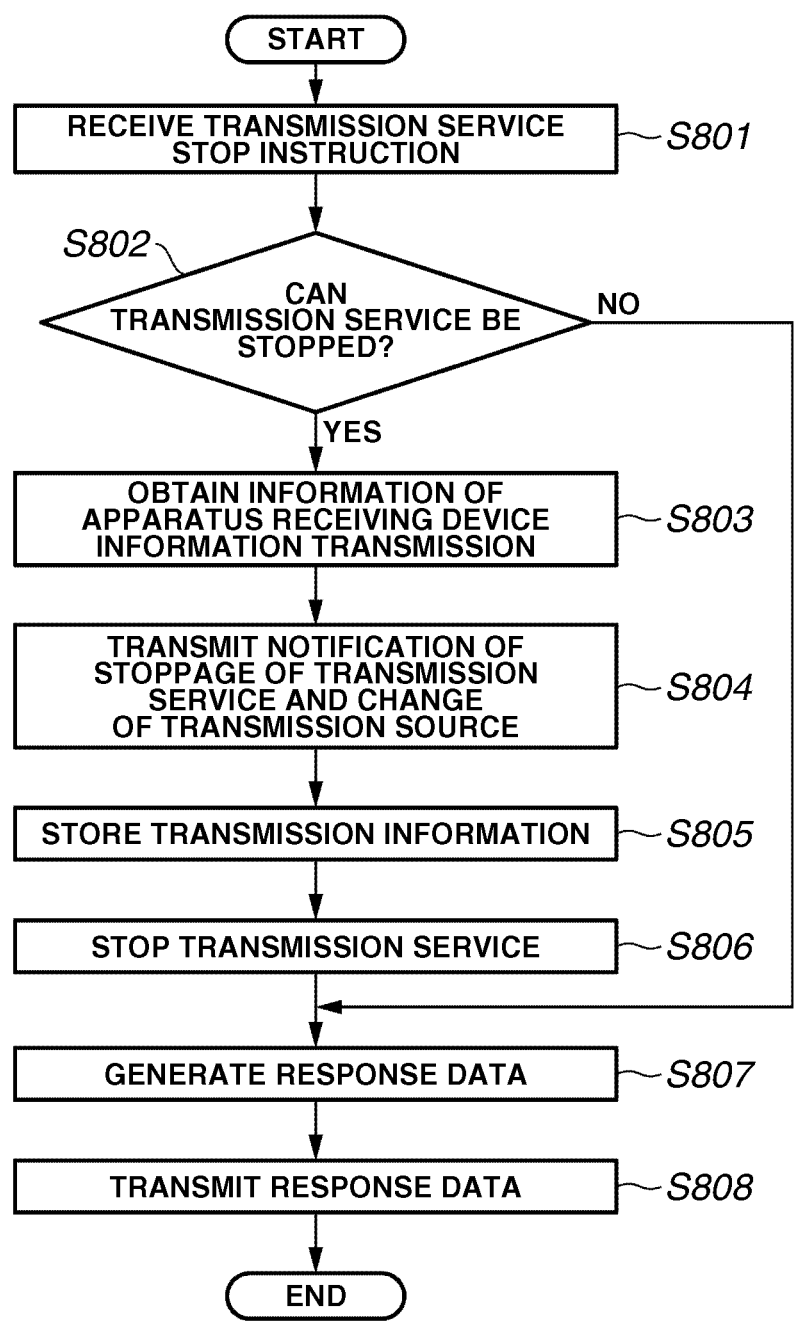
FIG. 8 is a flowchart showing an example of a first data processing procedure in the printing device according to an exemplary embodiment of the present invention.

On the other hand, in the printing device 102, which functions as a parent device among a plurality of devices, the device information transmission processing unit 403 in FIG. 4 determines whether to stop the device information transmission service in response to a stop request transmitted from the server apparatus 101, according to a control procedure shown in FIG. 8.

When the device information transmission processing unit 403 determines that the device information transmission service is stoppable, the printing device 102 transmits transmission source information indicating a transmission source to be changed for the device information transmission service to the printing device 103, which functions as another device.

On the other hand, the device information transmission processing unit 403 of the printing device 103, which functions as another device, acquires the transmission source information from the printing device 102. Then, based on the transmission source information acquired, the device information transmission processing unit 403 determines whether a transmission source setup can be changed according to a control procedure shown in FIG. 9.

When the device information transmission processing unit 403 of the printing device 103 determines that the transmission source setup can be changed, the printing device 103 changes transmission source information registered in the storage unit based on the received transmission source information.

Thus, in the device information transmission service, which has unitarily been managed by the printing device 102 so far, since the change of the transmission source is notified to the printing device 103, the printing device 103 can change, with no difficulty, the transmission source information to indicate that the transmission source has been changed from the printing device 102 to the server apparatus 101.

The printing device 102, which has functioned as a parent device so far, shifts to a child device that refuses the transmission setup instruction from a remote or local place, when determining that the device information transmission service is stoppable based on a stop request from the server apparatus 101.

Accordingly, even if the printing device 102, which has so far functioned as a parent device, serves as an administrator, the printing device 102 is set to a state of not accepting any setup of the transmission destination of the device information. Therefore, the device information transmission service is unitarily managed by the server apparatus 101. Accordingly, a likelihood of transmitting device information from a transmission source that is unintended by the system administrator by mistake can be reduced. Thus, the setup information can be correctly shared by devices.

After an environment of the device information transmission service has been centralized to the transmission from the server apparatus 101 as described above, a user may wish to return the environment of the device information transmission service to the transmission from the printing device 102.

Therefore, before starting the device information transmission service, the server apparatus 101 stores, on the hard disk 511, device information for specifying a parent device and a child device among a plurality of devices.

Figure 10:
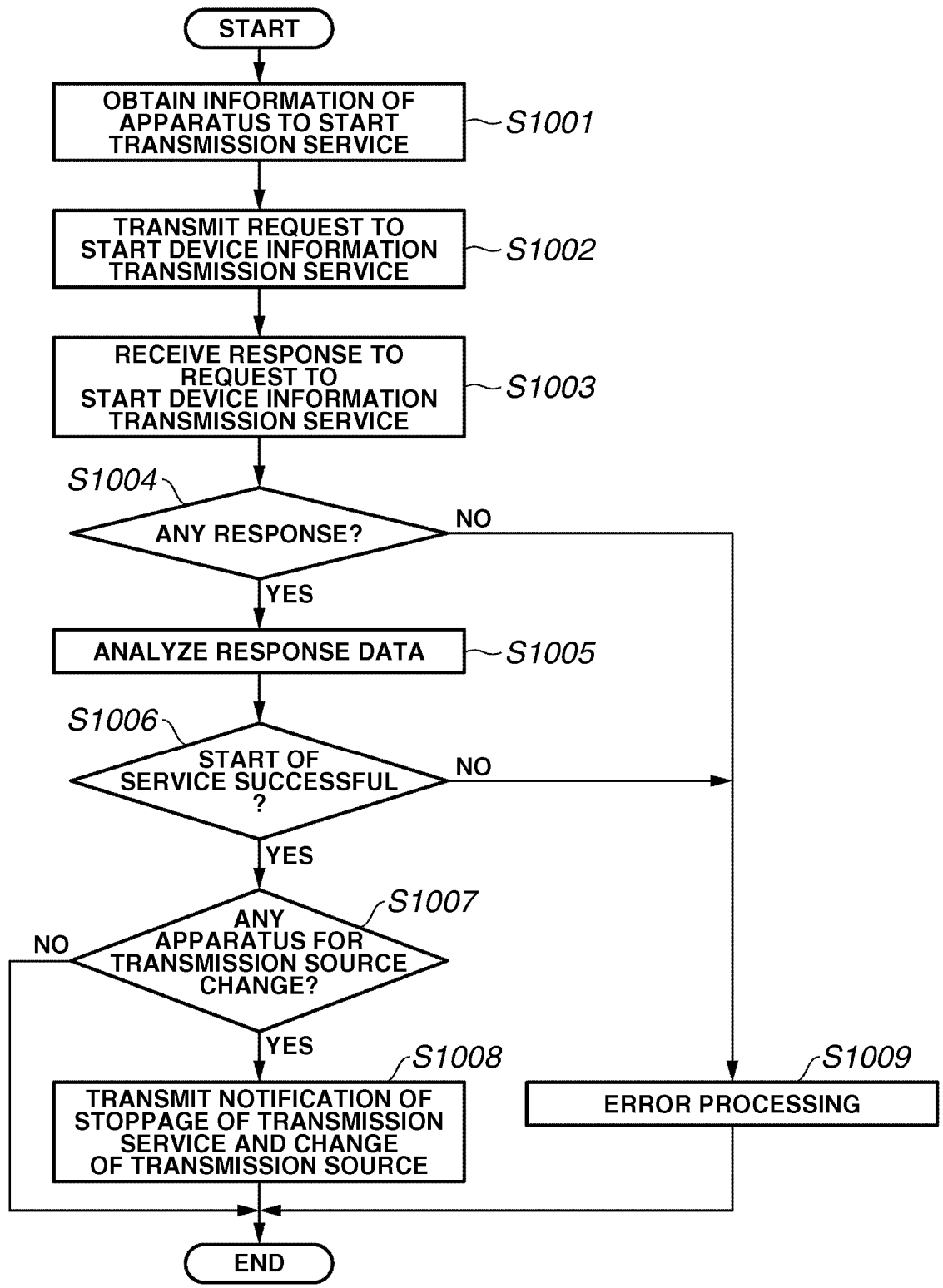
FIG. 10 is a flowchart showing an example of a second data processing procedure in the server apparatus according to an exemplary embodiment of the present invention.

Then, the device information transmission processing unit 601 of the server apparatus 101 executes a transmission service start request to the parent device specified based on the device information stored on the hard disk 511, according to a control procedure shown in FIG. 10.

Based on response data transmitted from the printing device 102 as a parent device in response to of the start request, the device information transmission processing unit 601 determines whether the printing device 102 was able to return to the transmission source for device information, according to the control procedure shown in FIG. 10.

If the device information transmission processing unit 601 determines that the printing device 102 was able to return to the transmission source, the server apparatus 101 notifies the printing device 103 serving as a child device that the transmission source for device information has been changed to the printing device 102.

Figure 11:
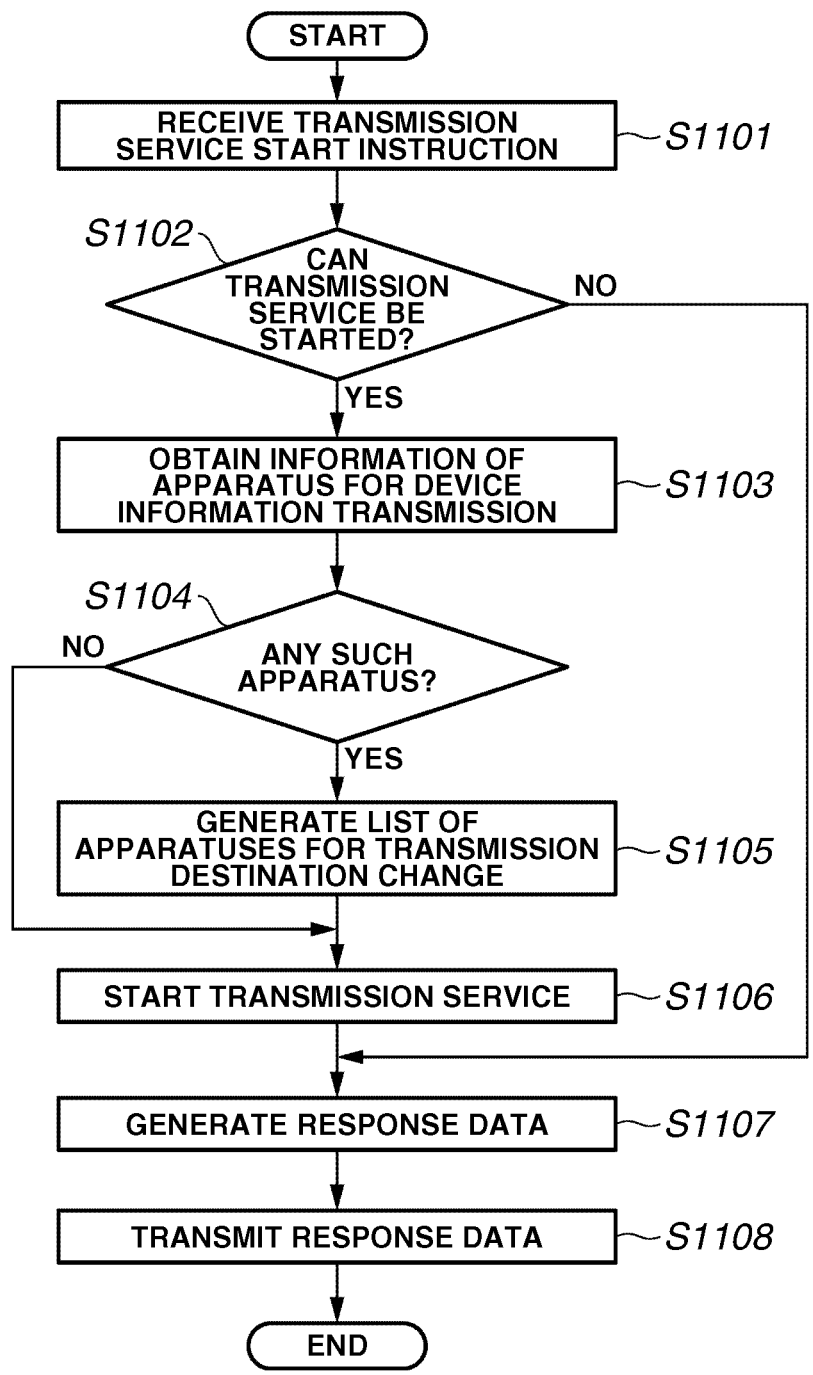
FIG. 11 is a flowchart showing an example of a third data processing procedure in the printing device according to an exemplary embodiment of the present invention.

Moreover, in the printing device 102 serving as a parent device, the device information transmission processing unit 403 determines whether the device information transmission service can be restarted, based on the transmission service start request transmitted from the server apparatus 101, according to a control procedure shown in FIG. 11.

When the device information transmission processing unit 403 determines that the device information transmission service can be restarted, the printing device 102 transmits response data indicating the restart of transmission service to the server apparatus 101.

As a result, after the transmission source of the device information transmission service is changed from the printing device 102 to the server apparatus 101, the transmission source can return back to the printing device 102 once again without trouble. Therefore, the device information transmission environment on the network can be reversibly changed according to the network administrator's intention.

Figure 7:
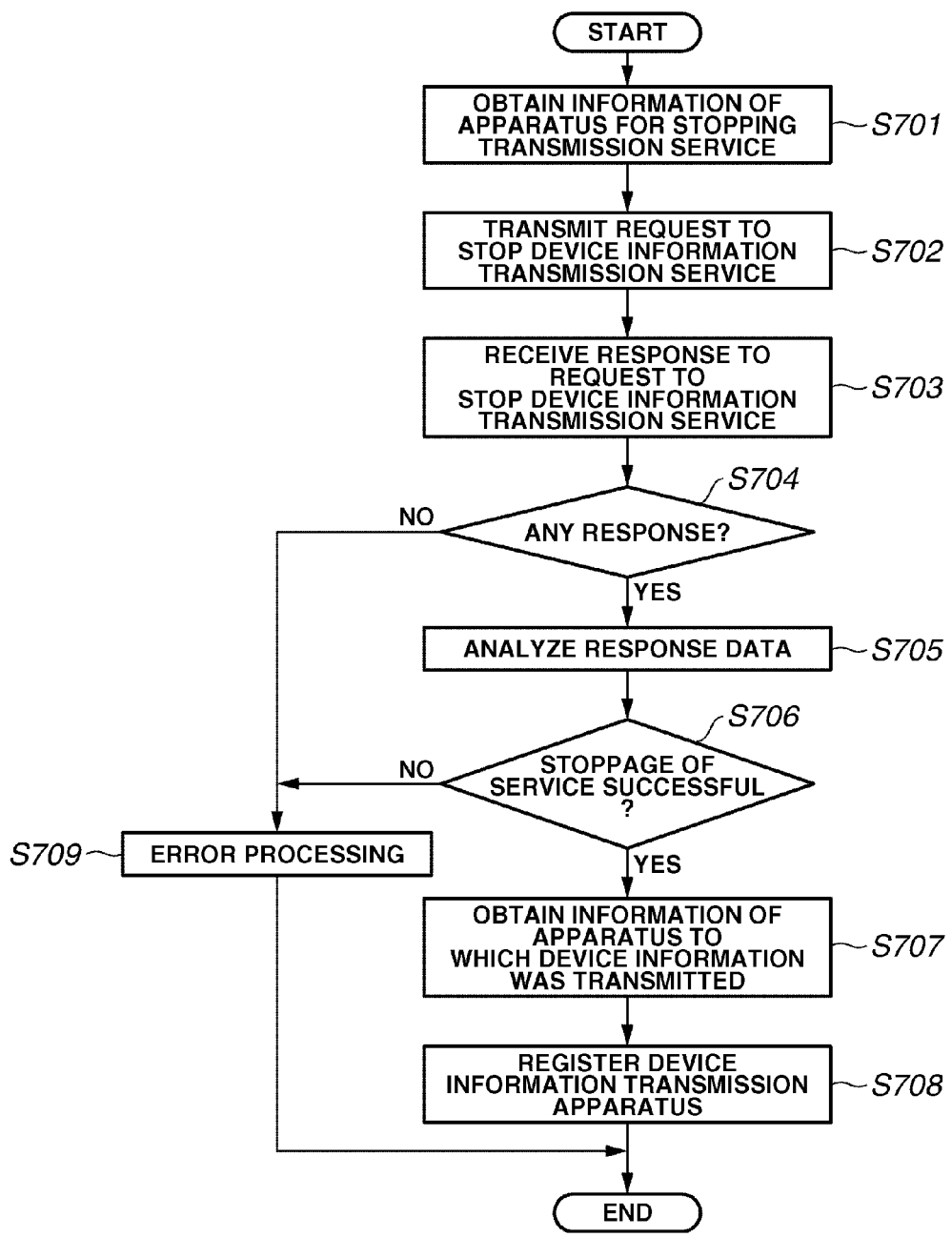
FIG. 7 is a flowchart showing an example of a first data processing procedure in the server apparatus according to an exemplary embodiment of the present invention.

In the present embodiment, predetermined device information includes setup information of each device, and address information of users who utilize each device. FIG. 7 is a flowchart showing an example of a first data processing procedure in the server apparatus 101 according to an exemplary embodiment of the present invention.

In this processing, a transmission service stop instruction is issued from the server apparatus 101 to the printing device 102 serving as a device information transmission apparatus on the network, and the transmission source for device information is changed from the printing device 102 to the server apparatus 101.

In FIG. 7, steps S701 to S709 are executed by the CPU 501 shown in FIG. 5 loading various modules shown in FIG. 6 (the device information transmission processing unit 601, etc., shown in FIG. 6) from the hard disk 511 to the RAM 503.

Moreover, in the present embodiment, the printing device 102 is assumed to have transmitted device information to the printing device 103 by the device information transmission service before the following processes are executed. In other words, a device information transmission setup by the device-to-device communication has been previously executed by the network administrator in the first system including only devices that transmit device information from a parents device to a child device. In this system, setup information for the printing device 102 (parent device) and the printing device 103 (child device) is already stored on the NVRAM 207 or the HD 210.

In this case, changing the first system to the server-to-device communication (the second system) can be performed by stopping the device information transmission service according to the following processing.

Also, the server apparatus 101 in the present embodiment has installed thereon an application program for transmitting device information by the device information transmission service and for controlling the transmission service to a device that receives the device information transmission service on the network. For instance, a utility software application that corresponds to the device information transmission processing unit 601 shown in FIG. 6 is installed on the server apparatus 101.

Thus, the following processes are executed by operating the utility software application via the user operation by a system administrator. Before the processes are executed, an authentication process for determining whether an executor is a proper system administrator can be performed.

Moreover, in the server apparatus 101, location information (Internet protocol address) on a device (the printing device 102 in this embodiment) providing the device information transmission service on the network is stored, for example, on the hard disk 511. Specifically, the location information is registered and stored beforehand as a device information management table (including a transmission destination list).

Now referring to FIG. 7, in step S701, the server apparatus 101 acquires the registered and stored information on the printing device 102 serving as a device information transmission apparatus on the network.

Note that information on the device information transmission apparatus on the network can be registered by a user manually operating the set button 304 on the operation panel 209 shown in FIG. 3. Alternatively, information on the device information transmission apparatus can be acquired using a service retrieval process by the server apparatus 101 on the network according to a predetermined protocol.

Next, in step S702, the server apparatus 101 transmits a request to stop the device information transmission service to the printing device 102, based on the location information of the printing device 102 subjected to the service stop, which is included in the information acquired in step S701. This request corresponds to a service stop instruction command which will be described below.

In the present embodiment, in step S702, the request to stop the device information transmission service transmitted from the server apparatus 101 to the printing device 102 includes a service stop instruction command (first information). Moreover, the request to stop the device information transmission service includes identification (location) information (second information) on an apparatus instructing the transmission service stop. In addition, the request to stop the device information transmission service includes identification (location) information (third information) on an apparatus for transmitting device information in place of an apparatus that has received the service stop instruction and has stopped the transmission service.

Moreover, in the present embodiment, the server apparatus 101 instructs the transmission service stop, and device information is transmitted from the server apparatus 101 after the transmission service of the printing device 102 is stopped. Therefore, identification information on the same server apparatus 101 is included in the second and third information.

Further, the identification information in the present embodiment is location information (Internet Protocol address and MAC address) on the server apparatus 101. However, any information can be included as long as the information can identify the apparatus.

In step S703, the server apparatus 101 receives a response to the service stop request from the printing device 102. Next, in step S704, the server apparatus 101 determines whether a response to the device information transmission service stop request in step S703 is received from the printing device 102.

Note that a predetermined time-out period is set when performing a response reception in step S703, and if no response is received within the predetermined period, the process is determined as an error (NO in step S704). Then, the process proceeds to step S709, where predetermined error processing is executed. On the other hand, in step S704, if there is a response (YES in step S704), the process proceeds to step S705, where the server apparatus 101 analyzes the received response data.

In the present embodiment, the response data from the printing device 102 includes a result (first response data) indicating whether the service stop request has been accepted by a device having received the service stop instruction. Moreover, the response data includes a list of identification (location) information (second response data) on devices to which a device having received the service stop instruction has been transmitting device information until stopping the transmission service.

Next, in step S706, the server apparatus 101 determines whether the service stop request has been accepted based on the analyzed result of the response data in step S705. If, in step S706, it is determined that the service stop request has been accepted (stoppage of the service successful; YES in step S707), the process proceeds to step S707.

In step S707, the server apparatus 101 acquires identification (location) information on an apparatus (the printing device 103) to which the printing device 102 stopping the transmission service has so far been transmitting device information, based on the analyzed result of the response data.

In the present embodiment, after the transmission service of the printing device 102 is stopped, device information is transmitted from the server apparatus 101 to the printing devices 102 and 103.

Then, in step S708, the server apparatus 101 registers the printing device 102 having received the transmission service stop instruction to a list of transmission destination apparatuses (devices) stored on the HD 511 of the server apparatus 101. Similarly, the server apparatus 101 registers the printing device 103 having received device information from the printing device 102 until the stoppage of the transmission service to the list of transmission destination apparatuses (devices) stored on the HD 511 of the server apparatus 101.

Thus, the server apparatus 101 registers apparatuses or devices to which the server apparatus 101 transmits device information to the list of transmission destination apparatuses (devices) stored on the HD 511 of the server apparatus 101. Then, the process ends.

When the server apparatus 101 performs device information transmission, the server apparatus 101 performs the device information transmission service to the apparatus or devices registered in the list of transmission destination apparatuses (devices).

On the other hand, if no response is received to the service stop request in step S704, and if the service stop is not accepted in step S706, the process proceeds to step S709, where a log indicating that the process is unsuccessful is recorded as error processing, and the process ends.

In this way, the server apparatus 101 issues the transmission service stop instruction to the printing device 102 serving as a device information transmission apparatus on the network, and automatically changes the transmission source for device information from the printing device 102 to the server apparatus 101. Therefore, a load of the network administrator's network environmental operation can be reduced.

FIG. 8 is a flowchart showing an example of a first data processing procedure in the printing device 102 according to an exemplary embodiment of the present invention. In this processing, which corresponds to the operation procedure of the printing device 102, a transmission service stop instruction is issued from the server apparatus 101 to the printing device 102 serving as a device information transmission apparatus on the network, and the transmission source for device information is changed from the printing device 102 to the server apparatus 101.

Moreover, steps S801 to S808 are executed by the CPU 201 shown in FIG. 2 loading various modules shown in FIG. 4

(including the device information transmission processing unit 403 shown in FIG. 4) stored on the hard disk 210 to the RAM 203.

Moreover, the process of the device information transmission setup by the device-to-device communication is previously executed by the network administrator at the printing device 102. Then, the setup information of the printing device 102 (parent device) is stored on the NVRAM 207 or HD 210 of the printing device 103 (child device). In this case, changing to the server-to-device communication can be performed by stopping the device information transmission service of the parent device as follows, in response to an instruction from the server apparatus 101.

Now referring to FIG. 8, in step S801, the printing device 102 receives a transmission service stop instruction request transmitted from the server apparatus 101 using a predetermined protocol via the network driver 408.

Next, in step S802, the printing device 102 determines whether the printing device 102 is executing the device information transmission service (by the device information transmission processing unit 403), or whether the device information transmission service can be stopped. If the printing device 102 determines that the device information transmission service can be stopped (YES in step S803), the process proceeds to step S803.

In step S803, the printing device 102 acquires identification (location) information on an apparatus (the printing device 103 shown in FIG. 1 in the present embodiment) to which the printing device 102 transmits device information from the HD 210.

Next, in step S804, based on the location information on the printing device 103, which is included in the identification information acquired in step S803, the printing device 102 transmits a notification of the stoppage of device information transmission service and the change of the transmission source for device information to the printing device 103 using a predetermined protocol.

Further, according to the present embodiment, the notification of the stoppage of the device information transmission service and the change of the transmission source for device information includes identification (location) information (first notification information) on an apparatus instructing the transmission service stop. Similarly, the notification includes identification (location) information (second notification information) on an apparatus (the server apparatus 101) for transmitting device information in place of an apparatus that has received the service stop instruction and has stopped the transmission service.

In step S805, the printing device 102 stores the location information on the printing device 103, which has been notified of the stoppage of the device information transmission service and the change of the transmission source for device information in step S804, on the HD 210.

Step S805 is performed for the following reasons. When an instruction for restarting the transmission service is received from the server apparatus 101 after the service stop instruction is received from the server apparatus 101, the printing device 102 restarts its own device information transmission service based on the information stored on the HD 210. Thus, the printing device 102 can immediately restart the device information transmission service to the printing device 103, the location information on which is previously stored.

Next, in step S806, the printing device 102 stops its own device information transmission service. Further, in the service stop processing in step S806, the printing device 102 stores identification information on the server apparatus 101, which has instructed the service stop, on the HD 210.

In step S807, the printing device 102 generates response data as a response to the transmission service stop instruction received from the server apparatus 101 in step S801. The response data includes a result (first response data) indicating whether the service stop request has been accepted, and a list of identification (location) information (second response data) on devices to which a device having stopped the transmission service has been transmitting device information until stopping the transmission service.

Next, in step S808, the printing device 102 transmits the response data to the server apparatus 101 using a predetermined protocol, and the process ends.

If, in step S802, the printing device 102 determines that the service stop is unable (that is, the service itself has not yet start; NO in step S802), then in step S807, the printing device 102 generates response data that includes only a result indicating the service stop request not being accepted. Then, in step S808, the printing device 102 transmits the response data to the server apparatus 101, and the process ends.

Moreover, when the device information transmission service is stopped in step S801, a service start instruction from another server apparatus and the device information transmission setup cannot be changed by a direct operation on the operation panel of a printing device.

As a result, the device information transmission setup from other devices cannot be changed except for a server apparatus that has instructed stopping the device information transmission service.

Figure 9:
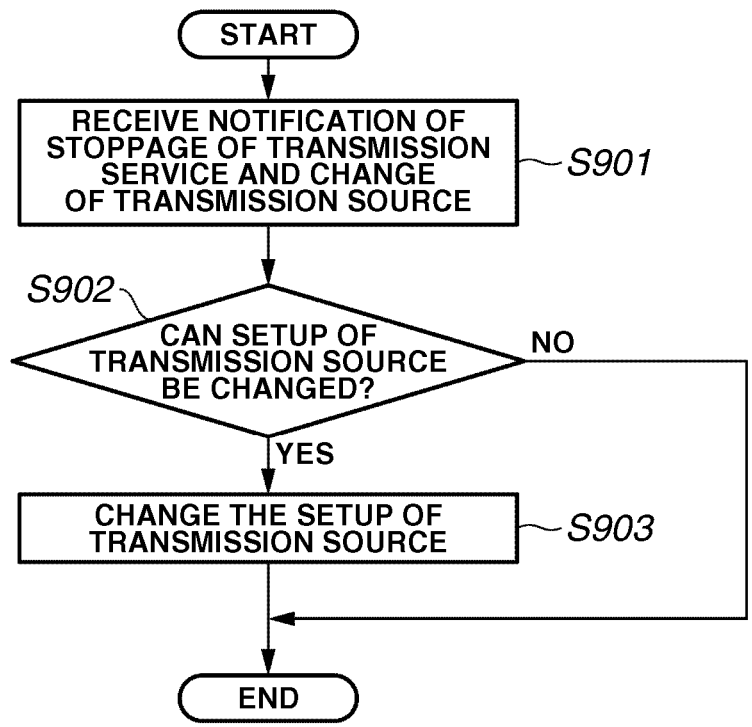
FIG. 9 is a flowchart showing an example of a second data processing procedure in the printing device according to an exemplary embodiment of the present invention.

FIG. 9 is a flowchart showing an example of a second data processing procedure in the printing device 103 according to an exemplary embodiment of the present invention.

In this processing, which corresponds to the operation procedure of the printing device 103, a transmission service stop instruction is issued from the server apparatus 101 to the printing device 102 shown in FIG. 1 serving as a device information transmission apparatus on the network. Then, the transmission source for device information to the printing device 103 serving as a device information receiving apparatus shown in FIG. 1 is changed from the printing device 102 to the server apparatus 101.

Moreover, steps S901 to S903 are executed by the CPU 201 in FIG. 2 loading various modules shown in FIG. 4 stored on the hard disk 210 into the RAM 203.

Now referring to FIG. 9, in step S901, the printing device 103 receives the notification of the stoppage of the device information transmission service and the change of the transmission source for device information (corresponding to the notification transmitted in step S804 shown in FIG. 8), which is transmitted from the printing device 102.

Next, in step S902, the printing device 103 determines whether a transmission source setup can be changed. If it is determined that the transmission source setup for transmission information can be changed (YES in step S902), the printing device 103 changes the transmission source setup in step S903. In the present embodiment, the transmission source is changed from the printing device 102 to the server apparatus 101.

Then, once the transmission source setup has been changed, the device information transmission setup cannot be changed by any others except for an apparatus corresponding to the changed transmission source, and the process ends.

Therefore, in step S901, if the notification received from the printing device 102 is the one transmitted from a device other than the transmission source set in the printing device 103, then in step S902, the printing device 103 determines that the setup cannot be changed (NO in step S902). Thus, the process ends without changing the transmission source setup.

FIG. 10 is a flowchart showing an example of a second data processing procedure in the server apparatus 101 according to an exemplary embodiment of the present invention. In this processing, which corresponds to the operation processing procedure of the server apparatus 101, a transmission service start instruction is issued from the server apparatus 101 to the printing device 102 shown in FIG. 1 serving as a device information transmission apparatus on the network. Then, the server apparatus 101 restarts the device information transmission service of the printing device 102. At the same time, the server apparatus 101 stops its own device information transmission service.

Moreover, steps S1001 to S1009 are executed by the CPU 501 in FIG. 5 loading various modules shown in FIG. 6 (including the device information transmission processing unit 601 shown in FIG. 6) from the hard disk 511 to the RAM 503. The device information transmission processing unit 601 can be referred to as a utility software application in some cases.

The server apparatus 101 in the present embodiment has installed thereon an application program for transmitting device information by the device information transmission service and for controlling the transmission service to a device that receives the device information transmission service on the network. Thus, the following processes are executed by operating the application via the user operation by a system administrator.

Now referring to FIG. 10, in step S1001, the server apparatus 101 acquires information on a device information transmission device (the printing device 102 in the present embodiment) on the network, which is caused to restart the device information transmission with the device-to-device communication.

In step S1002, the server apparatus 101 transmits a request to start the device information transmission service to the printing device 102, based on the location information of the printing device 102 subjected to a service start, which is included in the information acquired in step S1001, according to a predetermined protocol. In the present embodiment, a service start instruction command is included in the request to start the device information transmission service transmitted in step S1002.

In step S1003, the server apparatus 101 receives a response to the request from the printing device 102. In step S1004, the server apparatus 101 determines whether the response to the request to start the device information transmission service in step S1003 is received from the printing device 102.

Note that a predetermined time-out period is set when performing the response reception in step S1003, and if no response is received within the predetermined period, the process is determined as an error. The process proceeds to step S1009, where predetermined error processing is executed, and the process ends.

If, in step S1004, there is a response, the process proceeds to step S1005, where the server apparatus 101 analyzes the received response data. The response data includes a result (first response data) indicating whether the service start request has been accepted by a device having received the service start instruction. Moreover, the response data includes a list of identification (location) information (second response data) on devices to which a device having received the service start instruction will transmit device information when restarting the transmission service.

In the present embodiment, the printing device 102 has already transmitted device information to the printing device 103 before the service start instruction is received from the server apparatus 101. Therefore, when the service start request is accepted, location information on the printing device 103 is included in the information list corresponding to the second response data.

On the other hand, as for the printing device 103 that receives device information, referring to FIG. 9, a transmission source from which the printing device 103 receives device information has been changed from the printing device 102 to the server apparatus 101, based on the registration process for a transmission device by the server apparatus 101 shown in FIG. 7. Therefore, the device information transmission setup cannot be changed by any others except for the server apparatus 101. Accordingly, based on content of the information list, the printing device 103 performs a process for changing a device information transmission source apparatus in the subsequent steps.

In step S1006, the server apparatus 101 determines whether the service start request has been accepted by the printing device 102 based on the analyzed result of the response data in step S1005. If, in step S1006, it is determined that the service start request has been accepted (start of the service successful; YES in step S1006), the process proceeds to step S1007.

In step S1007, the server apparatus 101 refers to a list of identification (location) information on apparatuses to which the printing device 102 starting the transmission service transmitted device information in the past, based on the analyzed result of the response data. Then, the server apparatus 11 determines whether there is any apparatus necessary to change a device information transmission source on the list.

If it is determined that there is an apparatus necessary to change a device information transmission source on the list (YES in step S1007), then in step 1008, the server apparatus 101 transmits a notification of the stoppage of the device information transmission service and the change of the transmission source for device information to the corresponding apparatus (the printing device 103), and the processing ends. Here, the notification of the stoppage of the device information transmission service and the change of the transmission source for device information is similar to the information transmitted in step S804.

On the other hand, if there is no corresponding apparatus in step S1007, the process ends without executing step S1008. Moreover, if, in step S1004, it is determined that no response to the service start request is received, the process proceeds to step S1009. Moreover, if, in step S1006, it is determined that the service stop is not accepted, the process proceeds to step S1009. In step S1009, a log indicating that the process is unsuccessful is recorded as error processing, and the process ends.

Thus, the device information transmission process with the device-to-device communication can be temporarily changed to the device information transmission process with the server-to-device communication according to the request by the server apparatus 101. After that, the device information transmission process with the server-to-device communication can be changed back to the device information transmission process with the device-to-device communication depending on a change in the network environment.

FIG. 11 is a flowchart showing an example of a third data processing procedure of the printing device 102 according to an exemplary embodiment of the present invention. In this processing, which corresponds to the operation procedure of the printing device 102, a transmission service start instruction is issued from the server apparatus 101 to the printing device 102 serving as a device information transmission apparatus on the network. Then, the printing device 102 starts the device information transmission service. At the same time, the device information transmission from the server apparatus 101 is stopped.

Steps S1101 to S1108 are executed by the CPU 201 shown in FIG. 2 loading various modules shown in FIG. 4 (corresponding to the device information transmission processing unit 403 in FIG. 4) stored on the hard disk 210 to the RAM 203.

Now referring to FIG. 11, in step S1101, the printing device 102 receives a transmission service start instruction request transmitted from the server apparatus 101. Next, in step S1102, the printing device 102 determines whether the received request is the one transmitted from the server apparatus 101 which instructed the printing device 102 to stop the device information transmission service. Specifically, information on an apparatus that instructed the printing device 102 to stop the device information transmission service was stored at the time of the service stop (see step S805 in FIG. 8). In addition, in step S1102, the printing device 102 determines whether the transmission service can be started. If the printing device 102 determines that the device information transmission service can be started, the process proceeds to step S1103.

In step S1103, the printing device 102 acquires identification (location) information of an apparatus (the printing device 103 in this embodiment) to which the printing device 102 transmitted device information before the stoppage of the device information transmission service, which information was stored in step S805 in FIG. 8 when the printing device 102 stopped the device information transmission service.

Next, in step S1104, the printing device 102 determines whether the corresponding apparatus is included in the information acquired in step S1103. If it is determined that the corresponding apparatus is included in the acquired information (YES in step S1104), in step S1105, the printing device 102 creates a list of apparatuses relating to the transmission destination change. On the other hand, if, in step S1104, it is determined that no corresponding apparatus is included in the acquired information, the process proceeds to step S1106 without executing step S1105.

Next, in step S1106, the printing device 102 starts its own device information transmission (delivery) service. In step S1107, the printing device 102 generates response data as a response to the service start instruction from the server apparatus 101 received in step S1101. This response data corresponds to the response data received by the server apparatus 101 in step S1003 in FIG. 10. The response data includes a result (first response data) indicating whether the service start request has been accepted, and the list (second response data) created in step S1105. Then, in step S1108, the printing device 102 transmits the response data to the server apparatus 101, and the process ends.

Further, if, in step S1102, the printing device 102 determines that the service start is unable, then in step S1107, the printing device 102 generates response data that includes only a result indicating the service start request not being accepted. In step S1108, the printing device 102 transmits the response data to the server apparatus 101, and the process ends.

As described above, according to the present embodiment, a user such as a system administrator can perform a simple instruction from a server apparatus having installed thereon an application functioning as a device information transmission processing unit. According to the instruction, setups for device information at transmission source devices and transmission destination devices can be automatically effected in cooperation between the devices on the network. This enables preventing an illegal transmission and reception of device information from the unintended device and preventing overlapping of transmission.

Second Exemplary Embodiment

In the above-described first exemplary embodiment, the device information transmission process with the device-to-device communication can be temporarily changed to the device information transmission process with the server-to-device communication according to the request by the server apparatus 101. After that, the device information transmission process with the server-to-device communication can be changed back to the device information transmission process with the device-to-device communication depending on a change in the network environment.

However, in a case where the network environment returns back to the environment of the device-to-device communication, the number of child devices might have been increased in the environment of the device-to-device communication.

In this regard, in a case where the printing device 102 as a parent device intends to restore information on child devices as shown in FIG. 11, the process can include a step of accepting the registration of new child devices so as to freely meet the change in the network environment.

Third Exemplary Embodiment

In the first exemplary embodiment, if an anomaly occurs in the server apparatus 101 after the device information transmission service from the server apparatus 101 starts, a request to switch to the device information transmission service of another server may occur.

In this regard, a notification can be transmitted to child devices indicating that the device information transmission service from the server apparatus 101 is switched to that from another server apparatus. Then, the device information transmission service from a new server apparatus can start.

Fourth Exemplary Embodiment

The configuration of a data processing program readable by the network system according to an exemplary embodiment of the present invention is described below with reference to memory maps shown in FIGS. 12 and 13.

Figure 12:
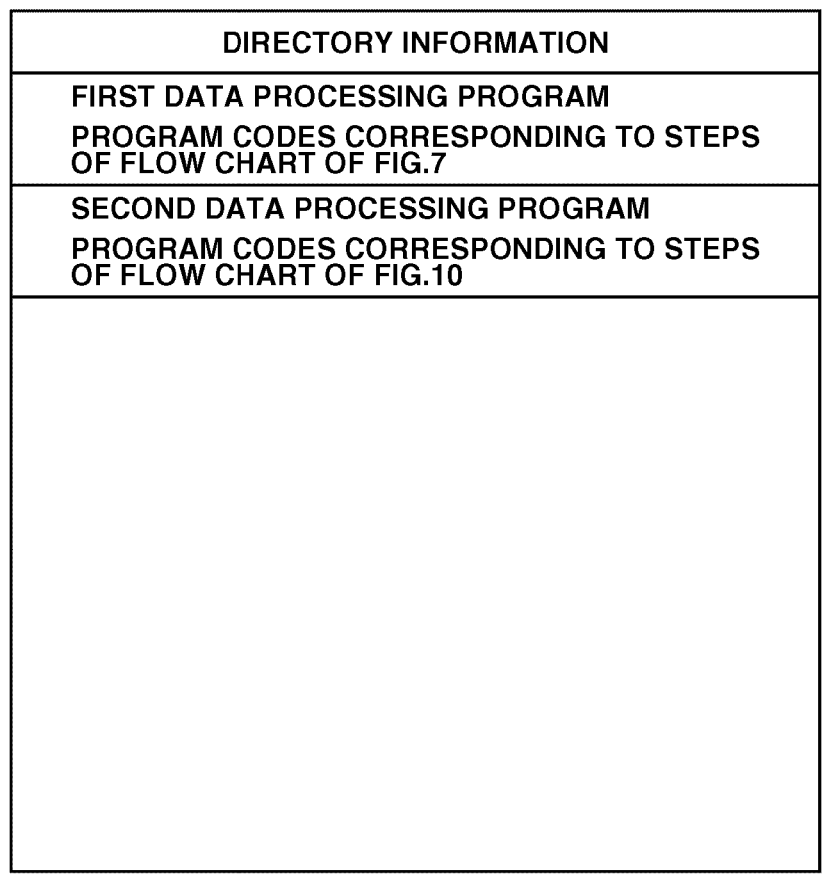
FIG. 12 is a chart illustrating an exemplary memory map of a storage media storing various data processing programs readable by the server apparatus according to an exemplary embodiment of the present invention.

FIG. 12 illustrates a memory map of a storage medium that stores various data processing programs readable by a server apparatus according to an exemplary embodiment of the present invention. And FIG. 13 illustrates a memory map of a storage medium that stores various data processing programs readable by a device according to an exemplary embodiment of the present invention.

In the aforementioned memory maps, information for managing the programs stored on the storage medium, for instance, version information and creator information, can be stored. In addition to that, information dependent on an operating system (OS) at a program reading side, for instance, an icon for identifying and displaying programs, can be stored in some cases.

In addition, data dependent on various programs can be managed in a directory. Moreover, a program for installing various programs on a computer and a decompression program for decompressing compressed programs can be stored in some cases.

The functions shown in FIGS. 7 to 11 in the embodiments can be implemented by a host computer according to a program installed from outside. In that case, the present invention is applicable to a case where information including programs is supplied from a storage media, such as a CD-ROM, a flash memory, and an FD, or from an external storage medium through the network.

A storage medium storing program code of software that executes the functions of the above-described embodiments can be supplied to a system or an apparatus. Then, an aspect of the present invention can be achieved by reading and executing the program code stored on the storage medium by a computer (alternatively, a CPU or an MPU) of the system or apparatus.

In this case, the program code itself read from the storage medium can achieve the functions of the above-described embodiments, and the storage medium storing the program code configures the present invention. Accordingly, any form of program can be used as long as it has a program function, such as object code, a program executed by an interpreter, and script data supplied to an OS.

The storage medium for supplying a program includes, for instance, a flexible disk, a hard disk, an optical disk, a magnet-optical disk, an MO, a CD-ROM, a CD-R, a CD-W, a magnetic tape, a nonvolatile memory card, a ROM, and a DVD.

Besides, as a method of supplying the program, a browser of a client computer can be used to connect to a web page on the Internet. A computer program according to the present invention can be supplied from the web page. Alternatively, the computer program can be supplied from a compressed file including an automatic installation function downloaded into a storage medium such as a hard disk.

Moreover, program code that constitutes a program according to the present invention can be divided into a plurality of files, and each file can be downloaded from different web pages. In other words, a WWW Server or an FTP server allowing a plurality of users to download the program file for achieving the functional processes of the embodiments in a computer is included in the scope of the present invention.

Moreover, the program according to the present invention can be encrypted and stored on a storage medium such as a CD-ROM to be distributed to users. Then, a user who meets a predetermined condition is allowed to download key information for decryption from a web page via the Internet. The user can install and execute the encrypted program using the key information.

Moreover, with program code read and executed by a computer, not only the functions of the embodiments are achieved but also an OS operating on the computer can perform all of or part of the actual processing based on the instruction of the program code. The functions of the embodiments are achieved by the processes described above.

In addition to that, program code read from a storage medium is written to a memory provided in a function extension board inserted in a computer or a function extension unit connected to a computer. Then, a CPU provided in the function extension board or the function extension unit performs all of or part of the actual processing based on the instruction of the program code. The functions of the embodiments are achieved by the above-described processes.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-275458 filed Sep. 22, 2005, which is hereby incorporated by reference herein in its entirety.

What is claimed:

1. An information processing system comprising:
    a plurality of devices including a first device configured to transmit device information and information of the first device as a transmission source to other devices of the plurality of devices; and
    an information processing apparatus configured to communicate with the plurality of devices and choose a second device among the plurality of devices as a transmission source, the information processing apparatus comprising:
        an acquiring unit configured to acquire location information from each of the plurality of devices;
        a stop instructing unit configured to cause the first device to stop transmitting the device information to the other devices based on location information acquired from the first device;
        a registering unit configured to register the plurality of devices as transmission destinations of device information and information of the second device as a transmission source;
        a first determination unit configured to determine whether the first device stops transmitting the device information to the other devices; and
        a transmitting unit configured to transmit the device information and the information of the second device as the transmission source to the plurality of devices registered by the registering unit after the first determination unit determines that the first device stops transmitting the device information to the other devices,
    wherein the first device shifts to a transmission destination device configured to refuse a transmission setup instruction when the stop instructing unit causes the first device to stop transmitting the device information to the other devices, and
    wherein the information processing apparatus does not change the transmission source from the first device to the second device when the first device does not respond to the stop instructing unit for a predetermined time.

2. The information processing system according to claim 1, wherein the first device includes:
    a first determining unit configured to determine whether transmission of the device information to the other devices of the plurality of devices can be stopped based on a stop instruction from the stop instructing unit; and
    a first notifying unit configured to notify the information processing apparatus of location information of the first device if it is determined by the first determining unit that the transmission of the device information can be stopped.

3. The information processing system according to claim 2, wherein the plurality of devices include:
    a receiving unit configured to receive information corresponding to the information processing apparatus;
    a second determining unit configured to determine whether transmission source information indicating a transmission source of the device information can be changed based on the information received by the receiving unit; and
    a changing unit configured to change a transmission source setup based on the information corresponding to the information processing apparatus if it is determined by the second determining unit that the transmission source information can be changed.

4. The information processing system according to claim 2, wherein the first device shifts to a transmission destination device configured to refuse the transmission setup instruction from a local or remote place if it is determined by the first determining unit that the process can be stopped.

5. The information processing system according to claim 4, wherein the information processing apparatus further comprises:

a start requesting unit configured to transmit a start request to a second device of the plurality of devices to cause the second device to start transmitting device information and the information of the second device as a transmission source stored in the second device to the other devices of the plurality of devices;

a second determination unit configured to determine whether the second device is configured as the transmission source of the device information based on response data received from the second device in response to the start request; and a notification unit configured to notify the other devices of a change of the transmission source of the device information to the second device if it is determined by the second determination unit that the second device is configured as the transmission source.

6. The information processing system according to claim 5, wherein the second device further includes:

a second determining unit configured to determine whether the device information can be transmitted based on the start request from the information processing apparatus; and a second notifying unit configured to transmit the response data to the information processing apparatus indicating whether the second device is configured as the transmission source if it is determined by the second determining unit that the device information can be transmitted.

7. The information processing system according to claim 1, wherein the device information includes setup information on each device and address information on users utilizing each device.

8. The information processing system according to claim 1, wherein the transmission source unitarily manages a device information transmission service.

9. An information processing apparatus communicating with a plurality of devices, comprising:

an acquiring unit configured to acquire location information from each of the plurality of devices including a first device;

a stop instructing unit configured to cause the first device to stop transmitting device information to other devices of the plurality of devices based on location information acquired from the first device;

a registering unit configured to register the plurality of devices as transmission destinations of the device information and information of the information processing apparatus as a transmission source;

a determination unit configured to determine whether the first device stops transmitting the device information to the other devices; and a transmitting unit configured to transmit the device information and the information of the information processing apparatus as the transmission source to the plurality of devices registered by the registering unit after the determination unit determines that the first device stops transmitting the device information to the other devices, wherein the first device shifts to a transmission destination device configured to refuse a transmission setup instruction when the stop instructing unit causes the first device to stop transmitting the device information to the other devices, and wherein the information processing apparatus does not change the transmission source from the first device to the information processing apparatus when the first device does not respond to the stop instructing unit for a predetermined time.

10. The information processing apparatus according to claim 9, wherein the transmission source unitarily manages a device information transmission service.

11. A device setup method for an information processing apparatus, the method comprising:

acquiring location information from each of a plurality of devices including a first device;

transmitting a stop instruction to the first device based on location information received from the first device to stop transmission of device information from the first device to other devices of the plurality of devices;

registering the plurality of devices as transmission destinations of the device information and information of the information processing apparatus as a transmission source;

determining whether transmission of the device information from the first device to the other devices is stopped; and transmitting the device information and the information of the information processing apparatus as the transmission source to the plurality of devices after transmission of the device information from the first device to the other devices is determined to be stopped, wherein the first device shifts to a transmission destination device configured to refuse a transmission setup instruction when the stop instruction causes the first device to stop transmitting the device information to the other devices, wherein the information processing apparatus communicates with the plurality of devices and chooses a second device of the plurality of devices as a transmission source, and wherein the information processing apparatus does not change the transmission source from the first device to the second device when the first device does not respond to the stop instruction for a predetermined time.

12. The device setup method according to claim 11, wherein the transmission source unitarily manages a device information transmission service.

13. A non-transitory computer-readable medium comprising a program for causing an information processing apparatus to execute a device setup method comprising:

acquiring location information from each of a plurality of devices including a first device;

transmitting a stop instruction to the first device based on location information received from the first device to stop transmission of device information from the first device to other devices of the plurality of devices;

registering the plurality of devices as transmission destinations of the device information and information of the information processing apparatus as a transmission source;

determining whether transmission of the device information from the first device to the other devices is stopped; and transmitting the device information and the information of the information processing apparatus as the transmission source to the plurality of devices after transmission of the device information from the first device to the other devices is determined to be stopped, wherein the first device shifts to a transmission destination device configured to refuse a transmission setup instruction when the stop instruction causes the first device to stop transmitting the device information to the other devices, wherein the information processing apparatus communicates with the plurality of devices and chooses a second device of the plurality of devices as a transmission source, and wherein the information processing apparatus does not change the transmission source from the first device to the second device when the first device does not respond to the stop instruction for a predetermined time.

14. The non-transitory computer-readable medium according to claim 13, wherein the transmission source unitarily manages a device information transmission service.

* * * * *